No. 863,474. PATENTED AUG. 13, 1907.
C. E. TWAMLEY.
SEED CORN TESTER.
APPLICATION FILED JAN. 2, 1907.
4 SHEETS—SHEET 1.
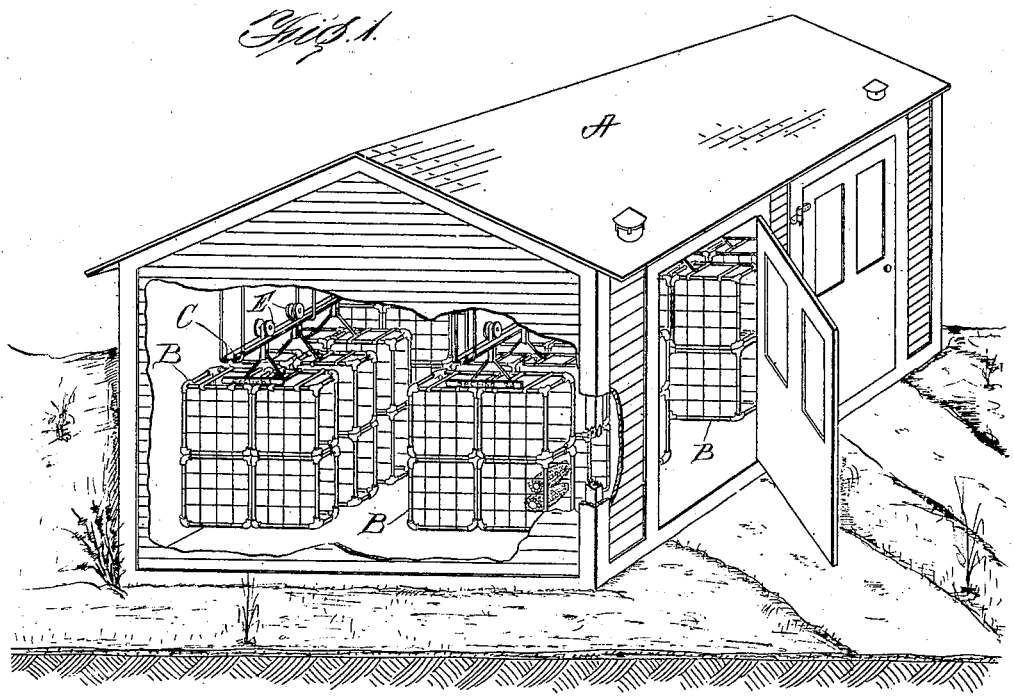
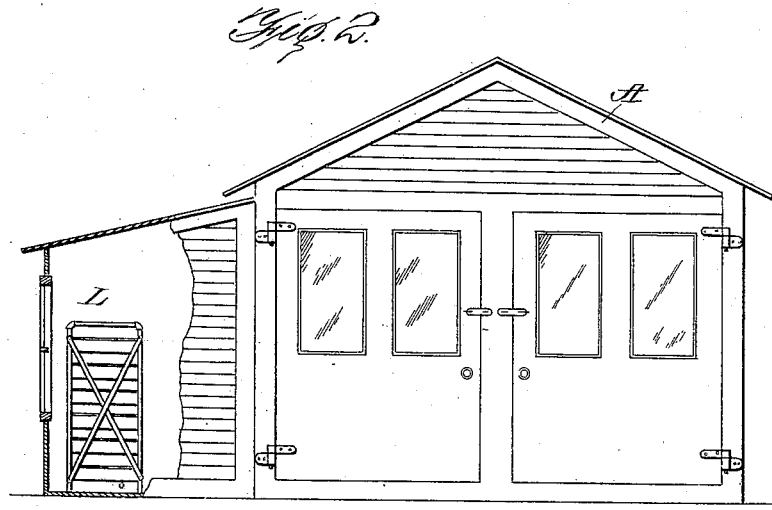

No. 863,474. PATENTED AUG. 13, 1907.
C. E. TWAMLEY.
SEED CORN TESTER.
APPLICATION FILED JAN. 2, 1907.
4 SHEETS—SHEET 2.
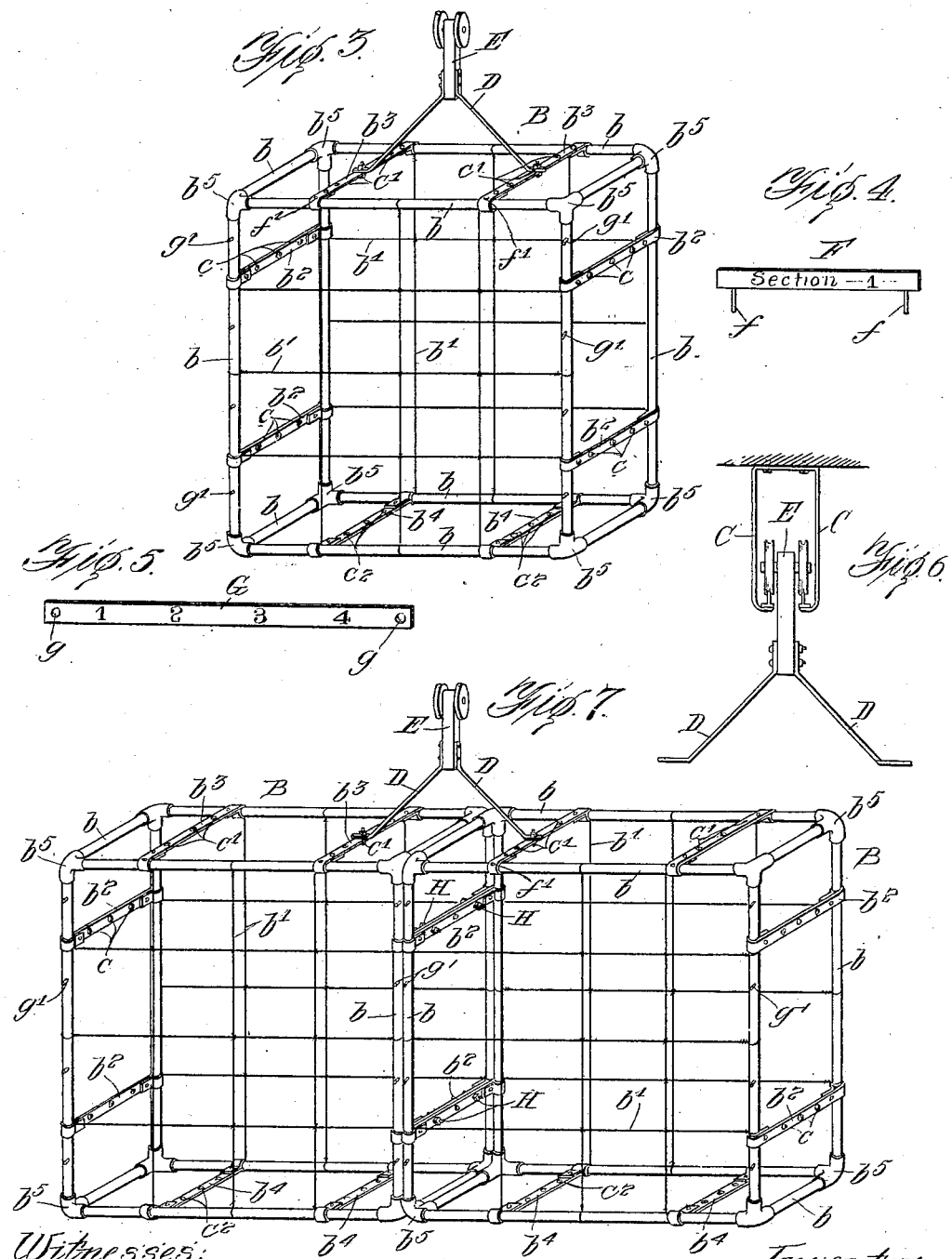
Witnesses:
Paul J. Guthmann
E. B. Granzoni
Inventor:
C. E. Twamley
By his Attorneys:
Baldwin Wight No. 863,474. PATENTED AUG. 13, 1907.
C. E. TWAMLEY.
SEED CORN TESTER.
APPLICATION FILED JAN. 2, 1907.
4 SHEETS—SHEET 3.
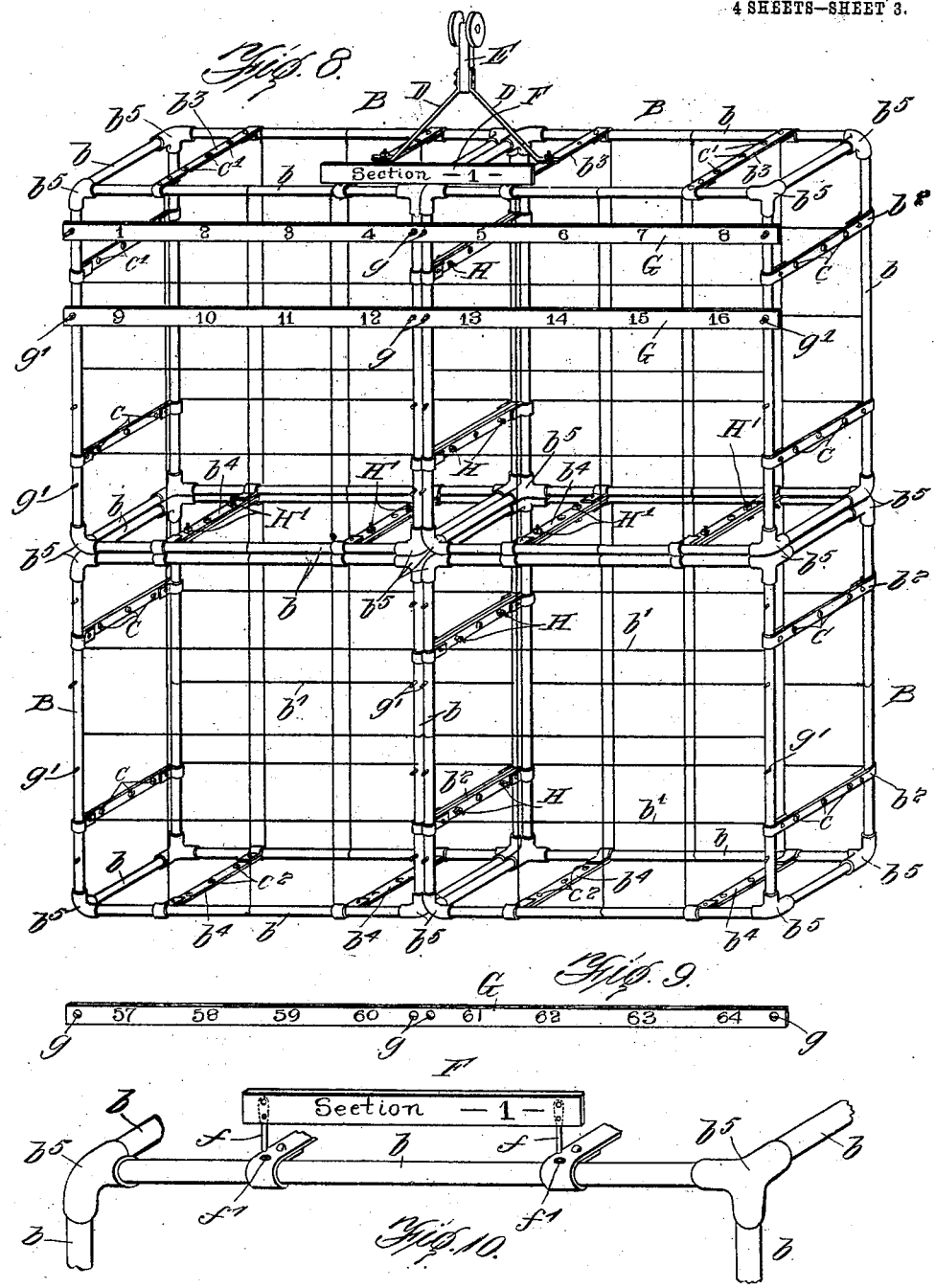

No. 863,474. PATENTED AUG. 13, 1907.
C. E. TWAMLEY.
SEED CORN TESTER.
APPLICATION FILED JAN. 2, 1907.
4 SHEETS—SHEET 4.
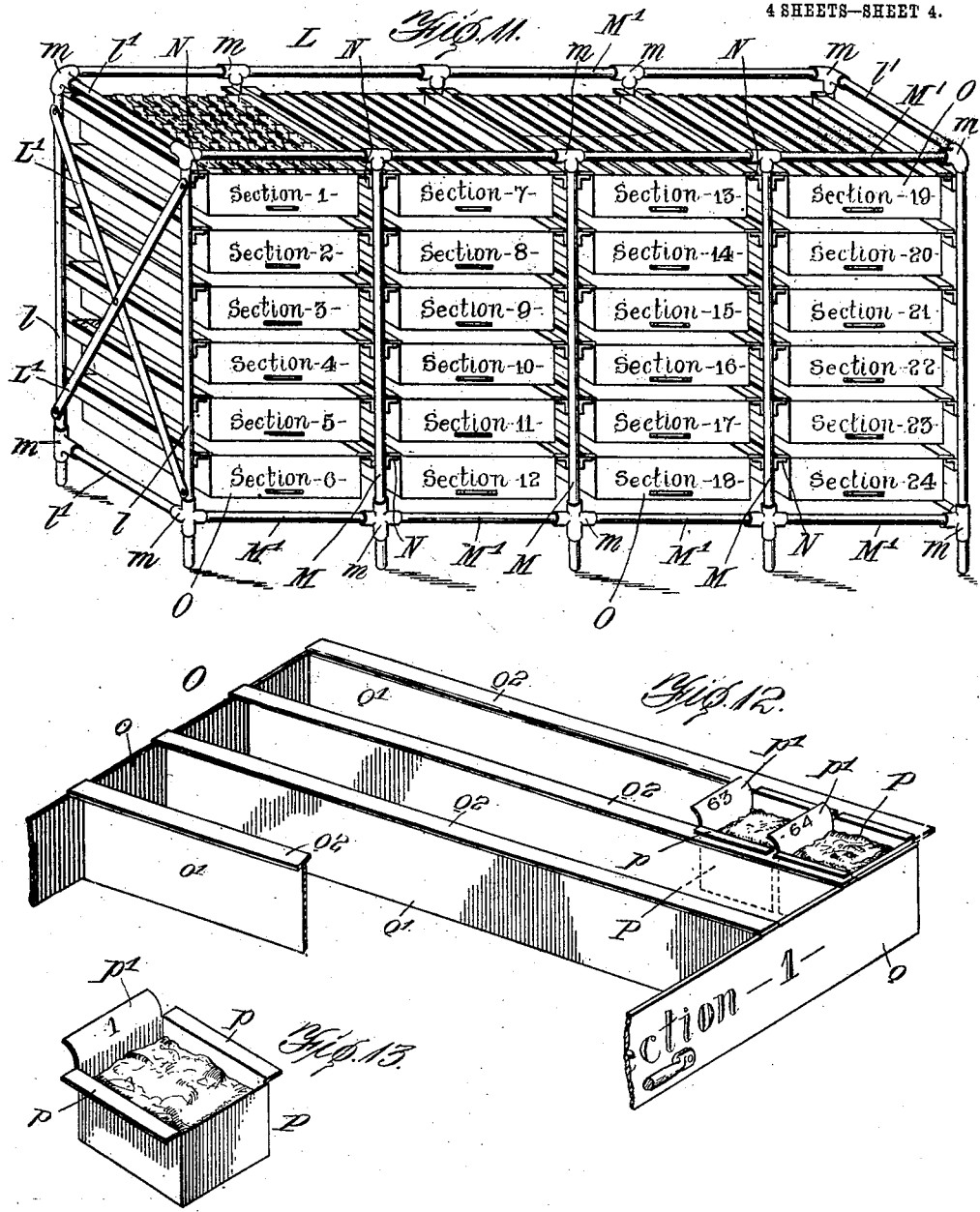

UNITED STATES PATENT OFFICE.

CLARK E. TWAMLEY, OF ALEXANDRIA, SOUTH DAKOTA.

SEED-CORN TESTER.

No. 863,474.  Specification of Letters Patent.  Patented Aug. 13, 1907.

Application filed January 2, 1907. Serial No. 350,463.

*To all whom it may concern:*

Be it known that I, CLARK E. TWAMLEY, a citizen of the United States, residing in Alexandria, in the county of Hanson and State of South Dakota, have invented certain new and useful Improvements in Seed-Corn Testers, of which the following is a specification.

In Letters Patent of the United States, No. 830,383, granted to me Sept. 4, 1906, I have shown an apparatus for testing seed corn to determine which ears contain good seed and strong germs, or a large percentage of good seed and strong germs, and which contain such a small percentage as to render them unprofitable for use. In the apparatus shown in said patent, cribs are employed for holding the ears of corn in which the ears may be kept ventilated and dry, properly measured and marked for identification. In connection with the crib, I show in said patent a germinating apparatus provided with means for causing good seed to germinate quickly. This apparatus as shown, is provided with cups or receptacles in which samples of seed corn from a number of ears are placed, each cup being so marked that kernels of corn taken from a compartment in the crib bearing one number may be placed in a germinating cup bearing the same number and thus the value of the several ears of seed corn may be determined and recorded without confusion.

The object of my present invention is to provide means for storing, on a larger scale, the ears of seed corn and for germinating selected kernels on a larger scale.
In the accompanying drawings: Figure 1 is a perspective view of a storage house with my improved corn cribs arranged therein. Fig. 2 is a front elevation of such a house to which is added another house or compartment in which the germinating apparatus may be located. Fig. 3 is a perspective view of a crib section which may be employed. Fig. 4 shows a front elevation of a numbered strip which may be added to the section to identify it. Fig. 5 shows a front elevation of one of the numbered strips for identifying the compartments of the section. Fig. 6 is a detail view in elevation showing how the crib or crib section may be suspended and moved from place to place. Fig. 7 is a perspective view of a crib formed of two sections bolted together. Fig. 8 is a perspective view of a crib formed of 4 sections bolted together. Fig. 9 shows a front elevation of one of the numbered strips which may be employed for identifying the compartments of the crib. Fig. 10 is a perspective view showing how the numbered strip or plate for marking the section may be attached thereto. Fig. 11 is a perspective view of my improved germinating apparatus. Fig. 12 is a detail view on a large scale in perspective showing the construction of one of the cup holders of the germinating apparatus. Fig. 13 is a perspective view of one of the germinating cups.

In my patent before mentioned, I have shown means for causing seed corn to germinate quickly, artificial heat being used in the apparatus, comparatively few germinating cups being employed and a relatively small number of cribs for holding the ears of seed corn being used. I have found that it is sometimes possible to cause the seed to germinate without the use of artificial heat, or the heat may be applied to a room in which germinating cups are suitably supported. I have also found that a very large number of ears of corn may be held in cribs suitably divided into compartments and suitably numbered for identification.

In Fig. 1 I have shown how the cribs for storing the ears of seed corn may be arranged. The house, A, may be of any suitable construction, but is preferably provided with doors and windows which may be thrown wide open or closed tightly, as circumstances may require, it being desirable to keep the corn clean and dry but well ventilated. It will be observed that the house, A, contains a series of cribs, B, the details of construction of which will be presently described, and that these cribs are supported by trolleys running on overhead tracks, C. I have shown two series of cribs thus suspended with a space or passage-way between them, so that the attendant may move between the two series and the cribs in each series are so arranged that a space may be left between them for the attendant to enter or they may be moved along the track in either direction, so that the attendant may go between any two of them. In this way access may be had to all the ears of corn in all the sections very conveniently.

In Fig. 3 I have shown a crib in which the frame is made of gas-pipe, $b$, crossed wires, $b'$ and bracing strips, $b^2$, $b^3$ and $b^4$. There are 4 vertical gas-pipe frame pieces, $b$, 4 gas-pipe frame pieces, $b$ at the top and 4 gas-pipe frame pieces, $b$, at the bottom. These are connected by couplings, $b^5$, each of which is suitably tapped at 3 places to receive the threaded ends of the frame pieces. The wires, $b'$, are strung horizontally and vertically to form compartments for supporting the ears of corn. In Fig. 3, the crib is shown as provided with 16 compartments, but of course a larger or smaller number may be employed. The bracing strips, $b^2$, serve not only to strengthen the frame of the crib, but these bracing strips are formed with holes, $c$, to receive bolts for connecting one section, B, with a similar section in the manner presently described. The strips, $b^3$, are formed with holes at $c'$, to receive bolts for connecting these strips to the arms, D, projected downwardly from the trolley, E, which is adapted to run on the track, C, as illustrated in Figs. 1 and 6. The connection between the arms, D, and the braces, $b^3$, is a detachable one for the purpose hereinafter described. The bracing strips, $b^4$, at the bottom of the crib, are also formed with holes, $c^2$, to receive bolts, when it is desired to connect the section, B, such as shown in Fig. 3, with another section below it. The trolley track, C, may be of the form shown in Figs. 1 and 6. As this is of well known construction, it need not be further described. Each section of the crib should be marked for identification. This may be done by using a plate or strip, F, such as shown in Fig. 4, provided with pins or studs, $f$, adapted to fit into holes $f'$. These may be formed in the front ends of the bracing strips, $b^3$. The several compartments of the cribs should also be marked for identification and this may be done by employing numbered strips or plates, G, such as shown in Fig. 5. One such strip may be used for numbering all of the compartments in one horizontal row, for instance, the strip, G, shown in Fig. 5 may be used for numbering the 4 compartments at the top of the section, B. A similar strip bearing the numbers 5, 6, 7 and 8, may be used for numbering the second horizontal row of compartments and so on. These strips may be formed with apertures, $g$, at their ends, adapted to receive studs, $g'$, suitably placed on the front of the frame. In this way, the strips may be made detachable and the strips used for numbering one crib or one section thereof, may afterwards be used for numbering or identifying the several compartments in other cribs or other sections.

In Fig. 7, I have shown two crib sections, B, similar to that shown in Fig. 3, bolted together side by side. It will be observed that the two crib sections, B, in Fig. 7, are of precisely the same construction, the bracing strips, $b^2$, being placed side by side and securely fastened together by bolts, H, and they are both suspended from the same trolley, E. The arms, D, are of such length and are so arranged that they straddle the space between the adjacent end bracing strips, $b^3$, in the two cribs and they also are so arranged that they exactly bridge the space between the two bracing strips, $b^3$, in one section of the crib. In this way, the same arms, D, may be used for supporting one crib section or two crib sections placed side by side. When two crib sections are connected in the manner shown in Fig. 7, they may be considered two sections and so marked by proper plates, F, of the kind shown in Fig. 4, or they may be considered one section and a proper section marker, F, such as shown in Fig. 4, may be placed in the middle part of the united sections. In like manner, numbered plates or strips, such as shown in Fig. 5, may be employed for numbering the several compartments in one of the sections, B, shown in Fig. 7, or a numbered plate or strip of twice the length may be employed for identifying the compartments in each horizontal row in the united sections.

In Fig. 8, I have shown how 4 sections, B, may be connected in a similar manner, bolts, H', being employed to unite the upper sections, B, with the lower sections. The 4 sections may be considered separate sections and identified in the manner before described, or the 4 cribs may be considered one section, in which case a section marking plate, F, such as illustrated, may be used and located at the middle top portion of the crib and numbered strips or plates, G, reaching from one side of the crib to the other, may be employed, one such numbered strip being used for each horizontal series of compartments. In Fig. 8, the united crib sections constitute a crib having 64 separate compartments.

The numbered strip shown in Fig. 9, is designed to be placed on the crib across the lower horizontal series of compartments. A larger number of crib sections may be united to each other in the same way, and, if desired, all suspended from the same trolley. It will be understood that each compartment of the crib is only about 2 inches square and therefore each section need only be 8 or 10 inches square, so that it may be desirable to connect a larger number of sections together than illustrated in the drawings. Of course each section may be, if desired, provided with a larger number of compartments, but in order to obtain a rigid structure, it is desirable that the frame of each section should not be made of very great dimensions. The cribs should be so suspended and arranged that the attendants may easily reach the ears of corn in all the compartments.

In Fig. 11, I have shown the means which I employ for holding germinating cups in which the kernels of corn selected from the several ears are placed and held until they are tested. In my patent before mentioned, I have shown the germinating cups arranged in a germinating chamber provided with a lamp, but when testing seed cord on a large scale, a room may be artificially heated to promote germination, or in some cases, the temperature and condition of the atmosphere are proper for germinating purposes, so that the cups may be supported in a frame in any suitable room, compartment or chamber. It is important, however, that the cups should be classified and marked in such manner that the kernels in each cup will be so marked for identification that the particular ear of corn from which they were taken may be easily ascertained. The supporting frame, L, is constructed mainly of gas-pipe. The vertical end pieces, $l$, are connected at top and bottom by cross pieces, $l'$, both of gas-pipe, and crossed bracing strips, L', may be used to strengthen the ends of the frame. Vertical pipes, M, arranged suitable distances apart, both at front and rear of the frame, are connected by couplings, $m$, with horizontally arranged pipe sections, M' and to the vertical pipes, M, and the pipes, $l$, are attached angle irons, N, which support the cup holders, O. These cup holders are constructed in the manner shown in Fig. 12, having front and rear ends, $o$, connected by longitudinal strips, $o'$, which are preferably flanged at their upper ends, $o^2$. The flanges, $o^2$, at the opposite sides of the holders, rest on the angle irons, N, and are free to slide thereon. The germinating cups, P, are of the construction shown in Fig. 13, consisting of a box or receptacle having flanges, $p$, adapted to rest on the flanges, $o^2$, as shown in Fig. 12 and other flanges, $p'$, which may be used as handles and which are suitably numbered.

In Fig. 11 I have shown 24 cup holders and each of these holders is adapted to receive 64 cups. Of course the number of cups and the number of holders may be varied, but the number of cups in each holder in this instance may correspond with the number of compartments employed in the crib illustrated in Fig. 8, there being 64 such compartments as before stated. In Fig. 8, the crib made up of 4 sections before specified is marked section 1 and there is a cup holder in the frame, L, marked section 1 which should contain 64 cups. In like manner, there is a cup holder corresponding with every crib and each cup holder contains a number of cups corresponding with the number of compartments in each crib. The cups are all consecutively numbered and the compartments in each crib are consecutively numbered. It will thus be understood that when grains of corn are taken from an ear in any compartment, of the crib, they may be placed in a correspondingly numbered cup in a correspondingly numbered section. In this way hundreds of ears of corn may be conveniently stored and arranged and easily tested without confusion. I have shown 24 cup holders in Fig. 11. Each one of these holders may contain 64 cups and there should be 24 cribs corresponding with the 24 cup holders. In this way corn from 1,536 ears may be tested without confusion and a proper record made, so that at any time it can be ascertained just what are the germinating properties of any ear of corn contained in any compartment of the cribs.

I have given a concrete example of an arrangement of cribs and cup holders, but it is obvious that in accordance with my present invention a very much larger number of ears of corn may be stored, classified and tested with great facility.

I claim as my invention:—

1. The combination of a germinator comprising a frame, a series of detachable cup-holders supported therein, each bearing a section number, a series of cups contained in each cup-holder and which are consecutively numbered, two series of suspended cribs with a passageway between them and which are movable in each series towards and from each other to permit access to the several cribs, said cribs being numbered correspondingly with the sections of the germinator and each crib being divided into ventilated compartments, each of which is numbered to correspond with a cup or compartment in the corresponding section of the germinator.

2. The combination with a germinating apparatus of two series of suspended cribs with a passageway between them, each of said cribs being divided into a series of compartments, all of which are numbered and the cribs in each series being movable towards and from each other to permit access to the numbered crib compartments.

3. The combination of two crib sections, each comprising a gas-pipe frame, crossed wires connected therewith and bracing strips at the side and detachable connections between the adjacent side bracing strips.

4. The combination of two crib sections, each comprising a gas-pipe frame, crossed wires for forming compartments in the section and side and top bracing strips, detachable connections between adjacent side bracing strips of the two sections, a trolley and arms carried by the trolley and connected to the top bracing strips in the two crib sections.

5. The combination of a set of crib sections, each comprising a gas-pipe frame, crossed wires attached thereto for forming compartments therein, top, side and bottom bracing strips and connections between the bracing strips for attaching the sections together.

6. The combination of a crib having a series of compartments, a strip detachably connected with the crib and having a series of numbers to identify the compartments, a germinating cup holder and a series of detachable germinating cups therein marked correspondingly with the numbered strip.

7. The combination of a crib having compartments arranged vertically and horizontally, a numbered strip for each horizontal row of compartments and having numbers successively arranged thereon, a section marker carried by the crib, a germinating cup holder having a section number corresponding with said crib and germinating cups in the holder consecutively numbered correspondingly with the numbers of the crib compartments.

8. The combination of a crib having a series of compartments, a strip detachably connected with the crib and having a series of numbers to identify the compartments and a germinator having a series of germinating compartments marked correspondingly with the numbered strip.

In testimony whereof, I have hereunto subscribed my name.

CLARK E. TWAMLEY.

Witnesses:
W. H. REIFERS,
M. J. MANEY.